Sept. 23, 1930.  E. HAMWI  1,776,431
PASTRY MOLD
Filed Sept. 23, 1929
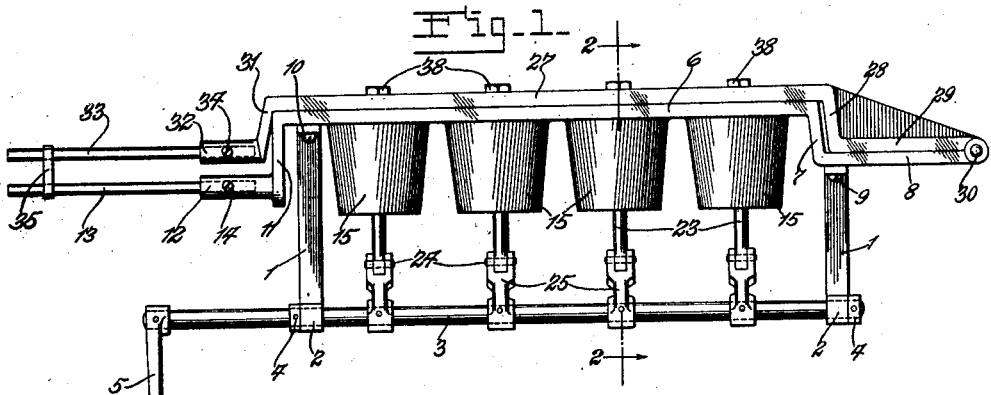
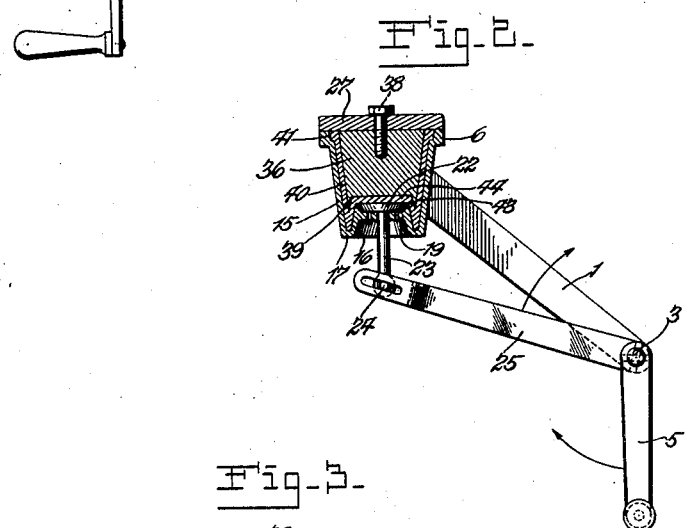
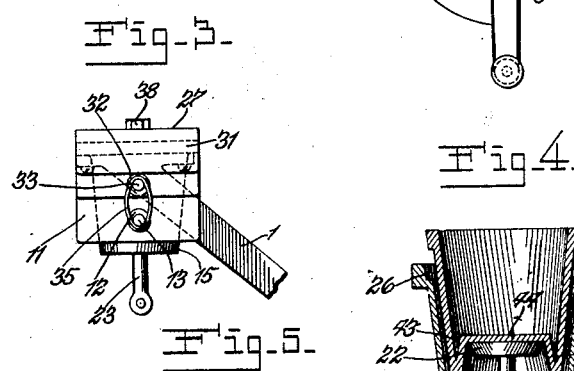
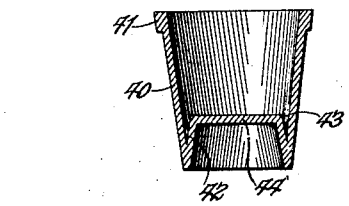
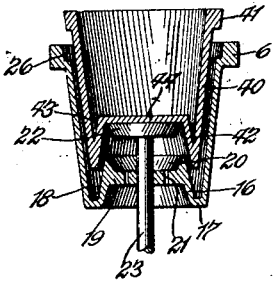
Inventor:
Ernest Hamwi,
by Rippey & Kingsland.
His Attorneys.

Patented Sept. 23, 1930

1,776,431

UNITED STATES PATENT OFFICE

ERNEST HAMWI, OF ST. LOUIS, MISSOURI

PASTRY MOLD

Application filed September 23, 1929. Serial No. 394,447.

This invention relates to pastry molds of the type designed and adapted for use in molding and baking pastry articles, such for instance as pastry cups; although the form of the molds may be varied without departure from the invention, so that the device may be used to produce different pastry forms.

An object of the invention is to provide an improved pastry mold for use in forming and baking pastry cups or containers of a novel form and design.

Another object of the invention is to provide an improved pastry mold for use in molding and baking articles of pasty or the like and comprising a novel device for ejecting the articles from the mold.

Another object of the invention is to provide a pastry mold for molding and baking cups or containers of a novel form and design.

Various objects and advantages of the invention will appear from the following description, reference being made to the accompanying drawing in which—

Fig. 1 is a side elevation of a pastry mold embodying one form of the invention.

Fig. 2 is a vertical cross sectional view of one of the molds approximately on the line 2—2 of Fig. 1.

Fig. 3 is an end elevation of the upper portion of the device.

Fig. 4 is an enlarged cross sectional view showing specifically a pastry cup being ejected from the mold.

Fig. 5 is a vertical cross sectional view of the pastry cup detached from the mold.

The invention shown in simplified form includes a frame or supporting structure comprising a pair of relatively rigid spaced frame members 1 provided with axially alined bearings 2 in which is journaled for rotation a shaft 3. This shaft 3 is held from longitudinal movement in either direction by appropriate means, such for instance as collars 4 attached to the shaft and engaging the frame members or supports 1. This shaft 3 is rotative and may be equipped with a crank 5 for use in rotating said shaft.

The receptacles for the pastry or other substance to be molded and baked, and each of which receptacles constitutes one part of a mold, are supported by a bar 6 having at one end a downwardly inclined arm 7 formed with an angular elongation 8. The elongation 8 is attached to the upper end of one of the supporting frame members 1 by fasteners 9, and the opposite end of the bar 6 is attached to the upper end of the other frame member 1 by fasteners 10. These fasteners 10 are removable and replaceable to permit separation of the parts. The end of the bar 6 beyond the fasteners 10 is formed with a downward projection 11 having a laterally extended arm 12 to which a rod 13 is attached by a removable fastener 14.

In the embodiment shown, the receptacles for the material that are supported by the bar 6 comprise downwardly tapered walls 15 that are circular in cross section but which, of course, may be of any other shape or form without departure from the nature and principle of the invention. The bottom of each receptacle wall 15 encloses an upwardly tapered wall 16, the lower end of which is integrally united with the lower end of the wall 15 by a wall conection 17. Thus, an annular space 18 is formed between the walls 15 and 16 in the lower end of the enclosure formed by said wall 15. Since the walls 15 and 16 diverge upwardly, the upper portion of said space is of greater radial width than the lower portion of said space, all of which is shown in Fig. 4. The wall 16 has therein a transverse wall 19 which is located somewhat below the upper end of the wall 16. The inner surface of the wall 16 above the wall 19 inclines outwardly to intersection with the outer surface of the wall 16, thus providing a downwardly tapered cavity 20 within the wall 16 and above the wall 19. The wall 19 has therethrough a number of vents 21.

An ejector for the pastry article produced in each mold is provided, each ejector comprising a disc 22 having a vertical thickness about equal to the depth of the cavity 20. Each disc 22 is arranged and designed to fit within the corresponding cavity 20. When the disc 22 is seated in the corresponding cavity 20, the upper surface of the disc is about flush with the upper edge of the wall 16. When the disc is seated in the cavity, it closes the vents 21. Each disc 22 is attached to a rod 23 which projects for sliding movements through an axial hole in the wall 19 and is operative to move the disc 22 from and to its seat in the cavity 20. The lower end of each of the rods 23 has operative connection 24 with one end of an arm 25. The opposite ends of the arms 25 are attached to the shaft 3, which may be rocked or turned to operate the arms 25 and thereby the discs 22 in order to move said discs to and from their seats in the cavity 20.

The receptacles 15 open through the bar 6 and around the upper end of each of said receptacles an annular groove 26 is formed, the outer wall of each groove being outwardly beyond the plane of the inner surface of the wall 15.

A bar 27 has at one end a downwardly extended arm 28 formed with an angular elongation 29, the outer end of which is pivoted to the outer end of the elongation 8 by a hinge device 30. The opposite end of the bar 27 is formed with a downward projection 31 having a laterally extended arm 32 to which a rod 33 is attached by a removable fastener 34. The rods 13 and 33 may be secured in a relationship to hold the bar 27 upon the bar 6 by a removable retainer device 35, which, as shown, is a ring or loop passed over said arms 13 and 33 and which is removable therefrom to permit the arm 13 to be manipulated to raise the bar 27 from the bar 6.

The members of the mold which cooperate with the receptacles 15 are supported by this bar 27 and each of said cooperating mold members comprises a downwardly tapered body 36 removably attached to the bar 27 by a detachable screw 38. The peripheral wall of each mold member 36 is shaped in conformity with the inner periphery of the cooperating member 15. The diameter of each mold member 36 is less than the inside diameter of the cooperating mold member 15, so that the mold is closed, as shown in Fig. 1, and the mold members 36 are within the mold members 15, and a space is formed between said mold members. For each mold, this space extends entirely around the mold member 36 and across the lower end of each mold member 36, so that a cup or container may be formed by the pastry or other substance shaped by the mold. The lower end of each mold member 36 is formed with a depending annular flange 39 which extends downwardly somewhat below the plane of the upper edge of the wall 16, and a short distance into the space 18.

The article formed by this mold is a friable and edible cup or container for containing pastry and other foods and food substances and comprises a downwardly tapered enclosing wall 40, the outer surface of which is formed by the inner surface of the wall 15 and the inner surface of which is formed by the outer surface of the mold member 36. The wall 40 has at its upper end a circumferentially thickened edge or rim 41 formed within the notch 26. The lower end of this cup or receptacle comprises an upwardly tapered wall 42 having its lower end formed integral with the lower end of the wall 40. Thus, the wall 42 inclines upwardly away from the wall 40, leaving an annular space 43 between said wall 40 and the upper portion of said wall 42. The upper end of the wall 42 is connected by an integral bottom wall 44 which forms the bottom of the cup or container.

In use, the substance to be molded by this device is poured into each of the receptacles 15 in sufficient amount to shape the desired article. Then the mold is closed by moving the bar 27 downwardly toward the bar 6 and causing the mold members 36 to shape the semi-fluid substance in conformity with the space between the mold members 36 and 15, which, in this specific instance, is in the form of a cup having a raised bottom wall 44 supported by the upwardly tapered wall 42 integrally united with the lower end of the wall 40. After the substance is shaped by operation of the mold in this way, the substance is baked for a sufficient time to obtain the desired result, after which the support 27 for the mold members 36 is raised to remove all of said mold members 36 from cooperative relationship with the mold members 15. Then the shaft 3 is turned in one direction a sufficient distance to cause the discs 22 to raise from their seats in the cavities 20 and loosen the molded and baked articles so that they may be readily removed from the mold or dropped from the mold by merely turning the mold upside down.

It is now clear that my improved device obtains all its intended objects in a highly efficient and satisfactory manner. The construction, arrangement and formation of the molds may be varied within equivalent limits without departure from the nature and principle thereof. I do not restrict myself unessentially or otherwise and as set forth in the appended claims.

I claim:

1. A mold for molding edible pastry cups, comprising a wall forming a hollow mold member having an open top, an inwardly and upwardly extending wall rigid with the lower end of said first wall and extending upwardly into the lower portion of said mold member and cooperating therewith to form an annular groove in the lower end of the mold, a transverse wall supported by said second wall below the upper edge of said second wall, a rod extending for sliding movements through said transverse wall, a disc attached to the upper end of said rod for movement thereby to and from contact with the upper portion of said second wall, and means for operating said rod to move said disc to and from contact with said second wall.

2. A mold for molding edible pastry cups, comprising a wall forming a hollow mold member having an open top, an inwardly and upwardly extending wall in connection with the lower end of said wall and extending upwardly and into the lower portion of said mold member and cooperating therewith to form an annular groove, a transverse wall supported by said second wall below the upper edge of said second wall and forming the bottom of a recess within said second wall, a disc movable into and out of said recess and forming the bottom of the central part of the mold when seated in said recess, a cooperating mold member movable into and out of said hollow mold member, an annular flange at the lower end of said cooperating mold member arranged to extend into said annular groove, and a support for supporting said cooperating mold member centrally within said hollow mold member.

3. A mold for molding edible pastry cups, comprising a wall forming a hollow mold member having an open top, an inwardly and upwardly extending wall in connection with the lower end of said wall and extending upwardly into the lower portion of said mold member and cooperating therewith to form an annular groove, a transverse wall supported by said second wall below the upper edge of said second wall and forming the bottom of a recess within said second wall, a disc movable into and out of said recess and forming the bottom of the central part of the mold when seated in said recess, a cooperating mold member movable into and out of said hollow mold member, an annular flange at the lower end of said cooperating mold member arranged to extend into said annular groove, a support for supporting said cooperating mold member centrally within said hollow mold member, and means for moving said disc from said recess to eject the molded article from the mold.

4. A mold for molding edible pastry cups, comprising a wall forming a hollow mold member having an open top, an inwardly and upwardly extending wall rigid with the lower end of said first wall and extending upwardly into the lower portion of said mold member and cooperating therewith to form an annular groove in the lower end of the mold, a transverse wall supported by said second wall below the upper edge of said second wall and having a vent opening therethrough, a rod extending for sliding movements through said transverse wall, a disc attached to said rod and movable thereby into and out of engagement with the upper end of said second wall, a cooperating mold member movable into and out of said hollow mold member and cooperating therewith to shape the contents of said hollow mold member into a hollow cup or container having a recess in the underside of its lower end, and means for operating said rod and thereby said disc to eject the molded article from the mold.

5. A mold for molding edible pastry cups, comprising a downwardly tapered annular wall and a bottom wall in rigid connection with the lower end of said annular wall and cooperating therewith to form a hollow mold member having an annular groove in its bottom and having an annular groove on the inside of the upper end of said annular wall, a disc movable to and from contact with said bottom wall and forming the central portion of the bottom of the mold when seated on said bottom wall, a cooperating mold member movable into and out of said first mold member and cooperating therewith to shape the contents of said first mold member into a hollow cup having a recess in the underside of its bottom and having a thickened rim around the margin of its upper portion, and means for operating said disc to eject the cup from the mold.

6. A mold for molding edible pastry cups comprising a downwardly tapered annular wall, a bottom wall in rigid connection with the lower end of said annular wall and cooperating therewith to form a hollow mold member having an annular groove in its bottom and having a recess in the upper side of said bottom wall, a disc movable to and from position in said recess in said bottom wall and forming the central portion of the bottom of the mold when seated in said recess, a cooperating mold member movable into and out of said first mold member and cooperating therewith to shape the contents of said first mold member into a hollow cup having a recess in the underside of its bottom, means for moving said cooperating mold member into and out of said first mold member, and means for operating said disc to eject the cup from the mold.

7. A mold for molding edible pastry cups comprising a downwardly tapered annular wall, a bottom wall in rigid connection with the lower end of said annular wall and cooperating therewith to form a hollow mold member having an annular groove in its bottom and having a recess in the upper side of said bottom wall, means rigidly supporting said mold member, a disc movable to and from position in said recess and forming the central portion of the bottom of the mold when seated in said recess, a rod rigid with said disc and projecting downwardly through said bottom wall, and means in connection with the lower end of said rod for operating said rod and thereby said disc to eject the cup from the mold.

ERNEST HAMWI.